United States Patent
Bifulco et al.

(10) Patent No.: US 11,301,751 B2
(45) Date of Patent: Apr. 12, 2022

(54) USING PROGRAMMABLE SWITCHING CHIPS AS ARTIFICIAL NEURAL NETWORKS ENGINES

(71) Applicant: NEC Europe Ltd., Heidelberg (DE)

(72) Inventors: Roberto Bifulco, Heidelberg (DE); Giuseppe Siracusano, Rome (IT)

(73) Assignee: NEC CORPORATION, Tokyo (JP)

( * ) Notice: Subject to any disclaimer, the term of this patent is extended or adjusted under 35 U.S.C. 154(b) by 1226 days.

(21) Appl. No.: 15/724,281

(22) Filed: Oct. 4, 2017

(65) Prior Publication Data
US 2019/0102672 A1    Apr. 4, 2019

(51) Int. Cl.
*G06N 3/063* (2006.01)
*G06N 3/04* (2006.01)

(52) U.S. Cl.
CPC .............. *G06N 3/063* (2013.01); *G06N 3/04* (2013.01)

(58) Field of Classification Search
CPC .................................. G06N 3/063; G06N 3/04
See application file for complete search history.

(56) References Cited

PUBLICATIONS

"Renzo Andri, YodaNN: An Ultra-Low Power convolutional Neural Network Accelerator Based on Binary Weights, Jun. 2016" (Year: 2016).*

"Pat Bosshart, P4: Programming Protocol-Independent Packet Processors, Jul. 2014" (Year: 2014).*

Minje Kim, et al., "Bitwise Neural Networks", Proceedings of the 31st International Conference on Machine Learning, Lille, France, 2015, JMLR: W&CP vol. 37, Jan. 22, 2016, pp. 1-5.

Itay Nubara, et al., "Binarized Neural Networks", 30th Conference on Neural Information Processing Systems, Dec. 2016, Barcelona, Spain, pp. 1-9.

Pat Bosshart, et al., "P4: Programming Protocol-Independent Packet Processors", ACM SIGCOMM Computer Communication Review, vol. 44, issue 3, Jul. 2014, pp. 87-95.

* cited by examiner

*Primary Examiner* — Alexey Shmatov
*Assistant Examiner* — Michael Aaron Merabi
(74) *Attorney, Agent, or Firm* — Leydig, Voit & Mayer, Ltd.

(57) ABSTRACT

A method for executing a binarized neural network (BNN) using a switching chip includes describing an artificial neural network application in a binarized form to provide the BNN; configuring a parser of the switching chip to encode an input vector of the BNN in a packet header; configuring a plurality of match-action tables (MATs) of the switching chip to execute, on the input vector encoded in the packet header, one or more of the operations including XNOR, bit counting, and sign operations such that the plurality of MATs are configured to: implement a bitwise XNOR operation between the input vector and a weights matrix to produce a plurality of first stage vectors, implement an algorithm for counting a number of bits set to 1 in the plurality of first stage vectors to produce a plurality of second stage vectors, and implement a sign operation on the second stage vectors.

18 Claims, 3 Drawing Sheets

```
constants
m1  = 0x5555555555555555;
m2  = 0x3333333333333333;
m4  = 0x0f0f0f0f0f0f0f0f;
m8  = 0x00ff00ff00ff00ff;
m16 = 0x0000ffff0000ffff;
m32 = 0x00000000ffffffff;

algorithm (var x)
x = (x & m1 ) + ((x >> 1) & m1 );
x = (x & m2 ) + ((x >> 2) & m2 );
x = (x & m4 ) + ((x >> 4) & m4 );
x = (x & m8 ) + ((x >> 8) & m8 );
x = (x & m16) + ((x >> 16) & m16);
x = (x & m32) + ((x >> 32) & m32);
return x;
```

USING PROGRAMMABLE SWITCHING CHIPS AS ARTIFICIAL NEURAL NETWORKS ENGINES

FIELD

The invention relates to artificial neural networks, and in particular, to systems and methods for executing binarized neural networks.

BACKGROUND

Executing artificial neural networks (NN) is increasingly required for a number of applications. The ability to process large NN's workloads in short time is an enabler of several use cases. In fact, a NN executor should guarantee low processing latency and high-throughput, while being economically viable.

Recent work proposed binarized (or bitwise) neural networks (BNN) as a NN model that allows for more efficient executors. A BNN uses only binary inputs and binary weights for its neurons, with the input, weight product replaced by a bitwise XNOR function. Furthermore, the neuron's activation function uses bit counting and the sign function.

Given their properties, BNN are considered for execution in embedded and constrained devices, or for the implementation of very fast algorithms when using more powerful general purpose servers.

SUMMARY

In an embodiment, the present invention provides a method for executing a binarized neural network (BNN) using a switching chip. The method includes describing an artificial neural network application in a binarized form to provide the BNN; configuring a parser of the switching chip to encode an input vector of the BNN in a packet header; configuring a plurality of match-action tables (MATs) of the switching chip to execute, on the input vector encoded in the packet header, one or more of the operations including XNOR, bit counting, and sign operations such that the plurality of MATs are configured to: implement, in a first stage, a bitwise XNOR operation between the input vector encoded in the packet header and a weights matrix of the neural network to produce a plurality of first stage vectors, implement, in one or more second stages, an algorithm for counting a number of bits set to 1 in the plurality of first stage vectors to produce a plurality of second stage vectors, and implement, in a last stage, a sign operation on the plurality of second stage vectors.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
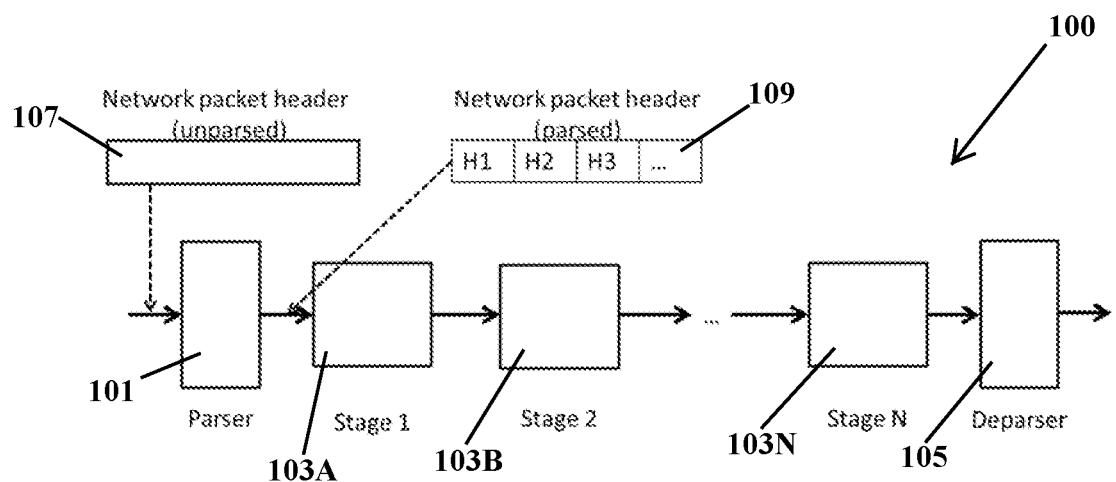
FIG. 1 is a block diagram of a switching chip configured to execute a binarized neural network (BNN) according to an embodiment of the invention.

Embodiments of the present invention provides systems and methods for executing a binarized, or bitwise, neural network (BNN). Embodiments of the present invention leverage switching chips of a programmable router.

According to embodiments of the present invention, the BNN uses only bit representations for inputs and weights, performs XNOR operations between the input vector and a neuron's weight vector, and provides output 1 for a neuron if the count of the input vector's bit is greater than, or equal, to half the total number of bits in the vector's size.

Embodiments of the present invention encode the input vector of the artificial neural network in a packet header field, repeat the packet header field in the packet header as many times as the maximum number of neurons that can be processed in parallel, split an algorithm for counting the number of bit set to 1 in a vector in a number of steps that can be executed by the pipeline's stages of a switching chip, execute the comparison between two numbers using a Boolean function executed in a switching chip's pipeline stage, and encode the result of the computation as per previous steps in the packet's header.

Embodiments of the present invention utilize the part of a switching chip that deals with packet headers. The switching chip can read and modify the headers and then send the corresponding network packet, with the modified headers, to a selected output port.

The architecture of a switching chip can be represented as a pipeline, i.e., as a series of connected modules that are each configured to execute a particular function. At a first module, which is a programmable parser, a header of received packed is parsed. The parser design is implementation specific, however in a general case it comprises a header identification module, a finite state machine description, e.g., in the form of a transitions table, and a field extraction module. Usually, the parser uses a combination of fast RAM, for instance a static RAM, and ternary matching memory, such as TCAMs, to store the parsing logic. The header identification module and the field extraction modules are, e.g., integrated circuits, microprocessors, or a portion thereof. Similarly, each of the modules in the connected series of modules can be, e.g., integrated circuits, microprocessors, or a portion thereof.

The outcome of the parsing is a structured representation of the packet header, the structured representation comprising different protocol headers and fields with their values. Since the parser is programmable, the switching chip programmer can specify both the protocol headers and their fields using an appropriate programming language. Appropriate programming languages include languages for programming packet processors, for example, programming protocol-independent packet processors (P4)—which is a high-level language for programming protocol-independent packet processors that works in conjunction with software defined network (SDN) control protocols like OpenFlow.

The programming of the programmable parser can be executed at configuration time, i.e., prior to the initiation of switching operations.

Following the first module, i.e. the programmable parser, the pipeline includes a series of stages. The number of stages may vary depending on the particular switching chip implementation. Each stage can implement, e.g., a match-action table (MAT). A MAT table includes, in a match portion, a list of definitions of network flows. Each network flow definition is specified in terms of a value of a header field. The MAT table additionally includes, in an action portion, an action that is to be applied to a packet having a header field value that matches the corresponding entry of the match portion of the MAT. Therefore, whenever a network packet "matches" an entry in the match portion of the MAT, the action (or actions) listed in the action portion of the MAT that corresponds to the matched entry in the match portion are applied to the packet. The actions are applied by an array of action units. The action units operate in parallel, but are constrained to an exclusive access to the packet header's fields. That is, only one action unit in a stage can read the header of a given packet. Furthermore, action units can perform only simple operations, such as logical bitwise operations (AND, OR, XOR, etc.) and simple arithmetic (Increment, add, etc.). The entries in the MAT implemented by each stage are configured at runtime by a programmer of the switching chip. Both the Match and the Action parts have access to the header fields as they are defined in the context of the parser/deparser programming.

The MAT table can be implemented using either a static RAM organized to implement a hash table, for example based on cuckoo hashing, or a ternary content-addressable memory (TCAM), used to implement a ternary matching table with a bitmask. The implemented table is also associated with a second memory area, typically a static RAM, which stores one or more instructions that have to be applied by the action unit. The action unit is typically constituted by a number of Very-Long-Instruction-Word (VLIW) processors. Such processors can access to (a subset of) packet header fields and modify their values.

Following the series of stages, a deparser builds a new packet header taking into account all the modifications performed on the original packet header by the different stages of the pipeline. Like the parser, the deparser is also programmable, and its internal architecture is similar to the one of a parser. In fact, the deparser programming is usually implicitly specified, since the deparser program can be derived directly from the parser program, e.g., expressed using the P4 language.

Embodiments of the present invention can execute a binarized (or bitwise) neural network (BNN) having K inputs (represented by a vector X), Q next layer neurons (represented by a vector H), and Q outputs (represented by a vector Y). The physical constraints of the switching chip determine the actual size of the vectors X, H, and Y. In particular, the number of stages in the switching chip's pipeline, the maximum size S of the packet header vector used by the switching chip internally to store header fields' values, the available number of action units Z, and the type of operations they perform constrain the actual size of the X, H, and Y. Typical values are N=32, S=512B, Z=200, while the operations type include bit movements, Boolean bitwise operations, shifts, increments and additions.

According to an embodiment of the invention, the inputs of a BNN are represented by a vector $X=\{x_1, x_2, \ldots, x_K\}$ and the next layer neurons are represented by a vector $H=\{h_1, h_2, \ldots, h_Q\}$, wherein for each $h_j \in H$, there is a vector $W_j=\{w_{j1}, w_{j2}, \ldots, w_{jK}\}$ of weights associated with the input X. An incoming packet header is used to encode the vector X, and the switching pipeline is configured to modify the packet header so as to produce the Y vector, which is then encoded in an outgoing packet header.

According to an embodiment of the present invention, the vector X is encoded in a custom-defined header field, i.e. in a BNN Field (BNF). The BNF field is 2K bits large, with X copied in the first K bits. The BNF is copied Q times in the packet header.

In the first pipeline stage $S_1$, the action entry portion of an MAT configures action units to perform Q XNOR operations $(O_{11} \ldots O_{1Q})$, i.e. one XNOR operation for each j-th BNF, where $Q_{i,j}$ represents the j-th operation in the i-th stage (i=1, ..., number of switching chip's stages), in order to produce Q vectors, i.e. $XXNOR_j$ for j=1, ..., Q. In effect, for each j-th copy of the BNF, the first K bits are used as input for a j-th neuron. The vectors $W_j$ are included as parameters of the action entry operations of the MAT. That is, the entry's action part will contain the Q operations, $O_{11} \ldots O_{1Q}$, and each $Q_{1j}$'s parameter is $W_j$. The result of the XNOR operations is stored back in the respective BNF header fields (j-th operation stores to the j-th BNF). Furthermore, the result is stored both in the first K bits of a BNF and in the last K bits, i.e., the same result is contained twice in BNF.

Once the stage $S_1$ is executed, the next stage $S_2$ will have, as input, the Q vectors $(XXNORQ_j)$. Our invention performs a Hamming weight computation, i.e., bit counting, for each such vector. Notice that the Hamming weight is the number of non-zero elements in a given vector and its computation is usually called a population count operation. However, in the most general case, a switching chip does not provide a population count operation in the action units of a stage. Therefore, according to an embodiment of the invention, an algorithm that performs addition of partial counts in a tree pattern is adapted to implement the population count operation using a number of stages after stage $S_1$. In a last stage $S_3$, a sign function is implemented.

FIG. 1 is a block diagram of a switching chip configured to execute a binarized neural network (BNN) according to an embodiment of the invention. The switching chip 100 includes a parser 101, a plurality of stages 103A, 103B, ..., 103N, and a deparser 105. The parser 101 receives a network packet having an unparsed network packet header 107 and parses the unparsed network packet header 107 to produce a parsed network packet header 109. The parsed network packet header includes a plurality of different protocol headers that each includes a field, i.e. H1, H2, H3, ....

Figure 2:
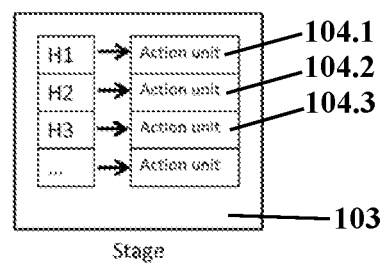
FIG. 2 is a block diagram of a stage of a switching chip configured to execute a BNN according to an embodiment of the invention.

FIG. 2 is a block diagram of a stage of a switching chip configured to execute a BNN according to an embodiment of the invention. The stage 103 includes a plurality of action units 104.1, 104.2, 104.3, .... Each of the plurality of action units is configured to apply an action to a packet that matches a corresponding entry in a "match" portion of a match action table (MAT) programmed into the stage 103 of the switching chip 100.

Figure 3:
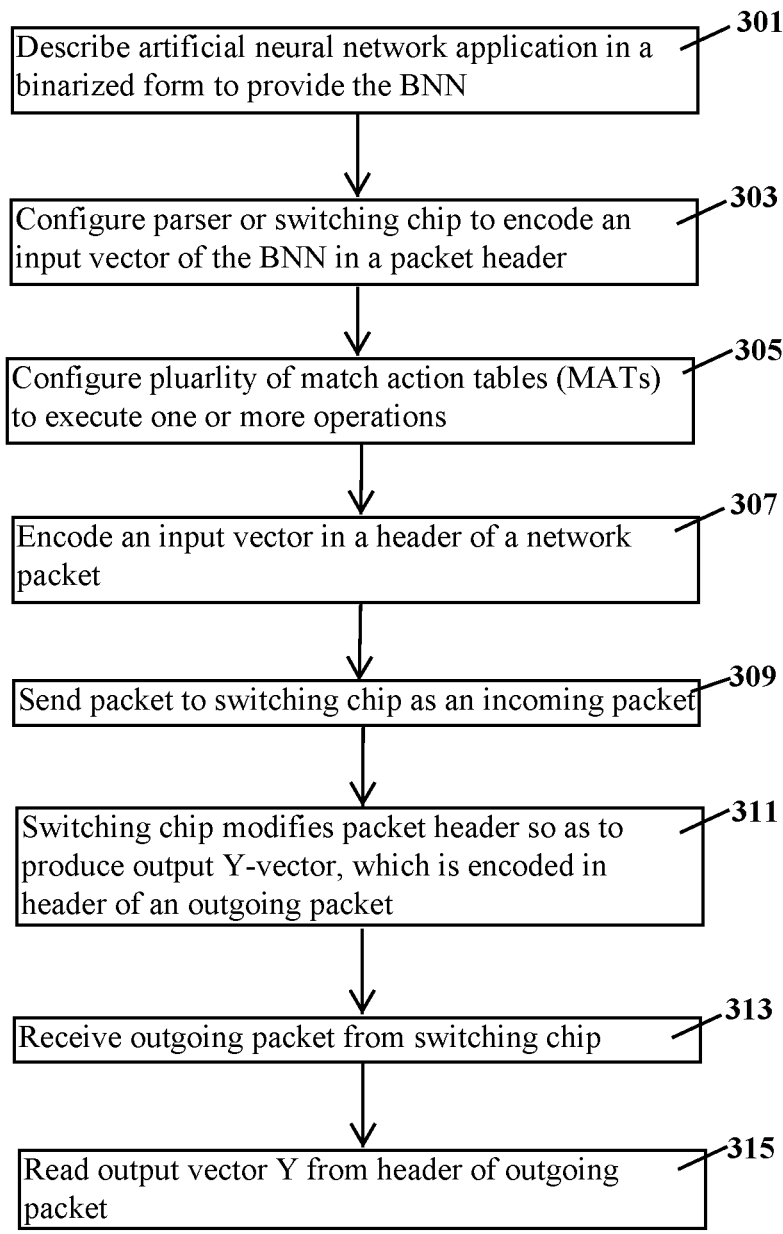
FIG. 3 is a flow diagram of a method for executing a BNN according to an embodiment of the invention.

FIG. 3 is a flow diagram of a method for executing a BNN according to an embodiment of the invention. At 301, an artificial neural network application is described in a binarized form to provide the BNN. At 303, the parser 101 of the switching chip 100 is configured to encode an input vector of the BNN in a packet header. The parser 101 can be configured, e.g., by an SDN controller using a language for programming packet processors, for example, programming protocol-independent packet processors (P4). At 305, a plurality of match-action tables (MATs) of the switching chip 100 are configured to execute, on the input vector encoded in the packet header, one or more operations including XNOR, bit counting, and sign operations. As a result of the configuring at 305, the plurality of MATs are configured to (i) implement, in a first stage, a bitwise XNOR operation between the input vector encoded in the packet header and a weights matrix of the neural network to produce a plurality of first stage vectors, (ii) implement, in one or more second stages, an algorithm for counting a number of bits set to 1 in the plurality of first stage vectors, and (iii) implement, in a last stage, a bitwise AND operation resulting from the previous stage and a variable whose value depends on the cardinality of the input vector. The algorithm for counting the number of bits set to 1 in the plurality of first stage vectors can be an algorithm that performs addition of partial counts in a tree pattern is adapted to implement the population count operation and provide a Hamming weight computation.

At 307, an input vector is encoded in a header of a network packet. The input vector is a vector $X=\{x_1, x_2, \ldots, x_K\}$. At 309, the packet is sent to the switching chip 100 as an incoming packet. At 311, the switching chip modifies the packet header so as to produce the Y vector, which is then encoded in a header of an outgoing packet. At 313, the outgoing packet is received from the switching chip 100. At 315, the output vector Y is read from a header of the outgoing packet.

Figures 4, 5:
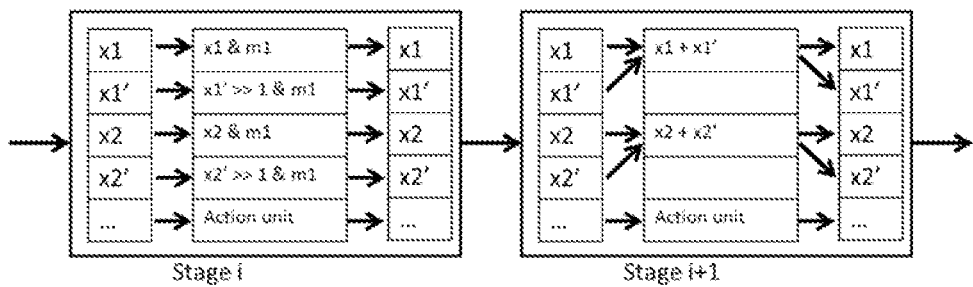
FIG. 4 depicts an example of an algorithm that can perform a Hamming weight computation.
FIG. 5 depicts a first step of an algorithm adapted such that the Hamming weight computation can be split into several steps.

According to embodiments of the invention, the Hamming weight computation can be implemented by adapting an algorithm that performs addition of partial counts in a tree pattern. FIG. 4 depicts an example of an algorithm that can perform a Hamming weight computation. The example of the algorithm shown in FIG. 3 corresponds to a 64-bit input vector, and contains 6 steps and 24 operations in total. The algorithm uses only AND, shift and add operations, and is therefore well suited for implementation by the action units of a stage. However, each action unit can only implement one operation per stage. Therefore, according to the embodiments of the invention, the algorithm is adapted such that the Hamming weight computation can be split into several steps. Each of the steps is executed in a pipeline's stage.

FIG. 5 depicts a first step of an algorithm adapted such that the Hamming weight computation can be split into several steps. Each $XXNOR_j$ is stored twice in a BNF field. For example, $XXNOR_1$ can be represented by entries x1 and x1'. Each part of a BNF is processed by a different action unit, thus, the algorithm first step can be implemented in just two stages (Stage i and Stage i+1 in FIG. 4). The first stage performs the AND operation and the shift, AND operation (we assume shift and bitwise AND can be performed in a single operation). The two operations store their results again in the BNFs. Therefore, the next Stage (Stage i+1) can perform the add operation. For each addition, the result is stored twice in the respective BNF field, so that a next stage (Stage i+2) can perform the remaining steps of the algorithm using the same technique.

Once the population counting is completed, after a number of stages that depends on K, each BNF field will contain the number of bits whose value was 1 in the original $XXNOR_j$ vector. A final stage can easily implement the sign function, by configuring a MAT's entry that performs Q operations. Each operation is a simple bitwise AND between the BNF field's top K bits and the value K/2. In fact, the sign function can be implemented ensuring that the number of is in the vector is bigger than the number of 0s. Since the top K bits of a BNF field contain the count of 1s, if such a count is bigger than half the total number of bits, then there were more is than 0s. After the final stage, each the top K bits of each BNF will contain a value that is either 1 or 0. Such values constitute the vector Y.

Stages can be repeated several times in the switch to implement more neural networks layers, or that a packet can be recirculated in the pipeline for the same purpose. In such cases, the Match part of a MAT can be used to distinguish between packets carrying data belonging to different layers. This would require reserving a few bits of the header to hold the current layer information. A similar approach could be also used to execute different BNN models concurrently.

Given the general capability of implementing BNN models, the system can be used for deriving generic approximations of any function.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for executing a binarized neural network (BNN) using a switching chip, the method comprising:
describing an artificial neural network application in a binarized form to provide the BNN;
configuring a parser of the switching chip to encode an input vector of the BNN in a packet header;
configuring a plurality of match-action tables (MATs) of the switching chip to execute, on the input vector encoded in the packet header, one or more of the operations including XNOR, bit counting, and sign operations such that the plurality of MATs are configured to:
implement, in a first stage, a bitwise XNOR operation between the input vector encoded in the packet header and a weights matrix of the neural network to produce a plurality of first stage vectors,
implement, in one or more second stages, an algorithm for counting a number of bits set to 1 in the plurality of first stage vectors to produce a plurality of second stage vectors, and
implement, in a last stage, a sign function operation on the plurality of second stage vectors.

2. The method of claim 1, further comprising:
encoding the input vector in a header of a network packet;
sending the packet to the switching chip as an incoming packet;
receiving the packet from the switching chip as an outgoing packet after the packet has traversed the switching chip;
and reading a result vector from the packet header.

3. The method of claim 1, wherein the sign function operation is implemented using a bitwise AND operation between the plurality of second stage vectors and a variable whose value depends on the cardinality of the input vector.

4. The method of claim 1, wherein the configuring the parser of the switching chip to encode the input vector of the BNN in the packet header is performed by a software defined network (SDN) controller.

5. The method of claim 4, wherein the SDN controller configures the parser of the switching chip using programming protocol-independent packet processors (P4).

6. The method of claim 1, wherein the algorithm for counting the number of bits set to 1 in the plurality of first stage vectors is a Hamming weight computation.

7. The method of claim 6, wherein the Hamming weight computation is performed only using AND, shift, and add operations.

8. The method of claim 1, wherein the algorithm for counting the number of bits set to 1 in the plurality of first stage vectors is executed by an algorithm that performs addition of partial counts in a tree pattern.

9. The method of claim 2, wherein the switching chip modifies the header of the incoming packet to produce the outgoing packet.

10. The method of claim 1, wherein the encoding the input vector in the header of the network packet includes repeating the input vector Q times in the header of the network packet, where Q is a number of neurons in the BNN.

11. A system for executing a binarized neural network (BNN) using a switching chip, the BNN being provided as a binarized form of an artificial neural network application, the system comprising a switching chip and one or more integrated circuits or hardware processors configured by computer program code to:
encode an input vector of the BNN in a packet header;
configure match-action tables (MATs) of a plurality of stages of the switching chip to execute, on the input vector encoded in the packet header, one or more of the operations including XNOR, bit counting, and sign operations such that the plurality of MATs are configured to:
implement, in a first stage, a bitwise XNOR operation between the input vector encoded in the packet header and a weights matrix of the neural network to produce a plurality of first stage vectors,
implement, in one or more second stages, an algorithm for counting a number of bits set to 1 in the plurality of first stage vectors to produce a plurality of second stage vectors, and
implement, in a last stage, a sign function operation on the plurality of second stage vectors; and
construct a new packet header using the result of the sign operation.

12. The system of claim 11, wherein the sign function operation is implemented using a bitwise AND operation between the plurality of second stage vectors and a variable whose value depends on the cardinality of the input vector.

13. The system of claim 11, wherein the system is configured to encode the input vector of the BNN in the packet header by a software defined network (SDN) controller.

14. The system of claim 13, wherein the system is configured by the SDN controller using programming protocol-independent packet processors (P4).

15. The system of claim 11, wherein the algorithm for counting the number of bits set to 1 in the plurality of first stage vectors is a Hamming weight computation.

16. The system of claim 15, wherein the Hamming weight computation is performed only using AND, shift, and add operations.

17. The system of claim 11, wherein the algorithm for counting the number of bits set to 1 in the plurality of first stage vectors performs addition of partial counts in a tree pattern.

18. The system of claim 11, wherein the system is configured to produce a header of an outgoing packet.

* * * * *